(12) United States Patent
Makos et al.

(10) Patent No.: US 7,104,563 B2
(45) Date of Patent: Sep. 12, 2006

(54) INTEGRAL LOCKING COUPLER

(75) Inventors: Tim Makos, Brookfield, WI (US);
Chris Irgens, Elm Grove, WI (US);
Joe Elliott, Mequon, WI (US); John Zapushek, Racine, WI (US)

(73) Assignee: Master Lock Company, Oak Creek, WI (US)

( * ) Notice: Subject to any disclaimer, the term of this patent is extended or adjusted under 35 U.S.C. 154(b) by 0 days.

(21) Appl. No.: 11/343,026

(22) Filed: Jan. 30, 2006

(65) Prior Publication Data

US 2006/0119074 A1  Jun. 8, 2006

Related U.S. Application Data

(63) Continuation of application No. 10/709,813, filed on May 28, 2004.

(60) Provisional application No. 60/320,230, filed on May 28, 2003.

(51) Int. Cl.
*B60D 1/00* (2006.01)
(52) U.S. Cl. ................................... 280/507
(58) Field of Classification Search ............... 280/507, 280/504, 508, 509, 514; 70/14, 58, 258, 70/232, 237
See application file for complete search history.

(56) References Cited

U.S. PATENT DOCUMENTS

| | | |
|---|---|---|
| 3,981,517 A | 9/1976 | Crochet, Sr. |
| 4,077,234 A | 3/1978 | Crochet, Sr. |
| 4,325,237 A | 4/1982 | Menzie |
| 5,638,711 A | 6/1997 | Schotthoefer |
| 5,730,456 A | 3/1998 | Bowers |
| 6,193,261 B1 | 2/2001 | Hahka |
| 6,370,927 B1 | 4/2002 | Gonzalez et al. |
| 6,402,181 B1 | 6/2002 | Lee |
| 6,575,000 B1 | 6/2003 | Li |
| 6,598,897 B1 | 7/2003 | Patti |
| 6,666,051 B1 | 12/2003 | Li |
| 6,694,781 B1 | 2/2004 | Li |
| 2005/0225054 A1* | 10/2005 | Budge ............... 280/507 |

FOREIGN PATENT DOCUMENTS

| | | |
|---|---|---|
| DE | 3703626 A1 | 8/1988 |
| DE | 3927423 A1 | 2/1991 |
| EP | 0 455 251 A2 | 6/1991 |
| FR | 2 673 891 A1 | 9/1992 |

* cited by examiner

*Primary Examiner*—Tony Winner
(74) *Attorney, Agent, or Firm*—Calfee, Halter, & Griswold LLP (57) ABSTRACT

An integral locking coupler comprising a locking mechanism mechanically coupled to a set of engagement pins for securing a coupler to a receiver. The locking mechanism translates movement to the engagement pins to move them to and from an extended position and a retracted position. When in the extended position, the engagement pins engage the receiver thereby securing the coupler. When in the retracted position, the engagement pins are generally contained within the coupler housing allowing the coupler to be inserted into and removed from the receiver.

21 Claims, 9 Drawing Sheets

INTEGRAL LOCKING COUPLER

CROSS REFERENCE TO RELATED APPLICATIONS

This application is a continuation application of U.S. patent application Ser. No. 10/709,813, filed May 28, 2004, which claims the benefit of U.S. Provisional Patent Application No. 60/320,230, filed May 28, 2003, the entire disclosures of which are hereby incorporated by reference.

BACKGROUND OF INVENTION

The present invention relates to an improved trailer coupler and more particularly to a trailer coupler to provides easy engagement and disengagement from a receiver and further includes a locking mechanism.

Typical vehicle hitch mechanism employ a mount, a hitch pin and a lock. When engaging the standard hitch mechanism, all three of the pieces, namely the mount, the hitch pin, and the lock, must be aligned and properly placed. Each must be assembled separately, thus taking substantial time and effort. This can be especially troublesome in inclement weather and on hitches that are located close to the pavement or shrouded by bumpers. The mount or coupler is placed in the receiver, properly aligned and then secured with a hitch pin. A lock is then applied to the hitch pin to secure the mounting assembly.

Prior art assemblies have attempted to combine certain of these features, however have not provided a fully-functioning locking coupler. For example, in some references a locking mechanism is not employed, thereby requiring a separate locking component. These references generally include spring-biased bolts that move in and out to engage the coupler. In some references, the bolts must be manually forced inward in order to retract the bolts and allow for insertion into the receiver. In other references, the bolts are moved in and out through engagement of a surface that has different dimension depending on the placement of the surface. For example, a blocker may be used, wherein the blocker has two different dimensions. The first dimension is larger and is positioned for maintaining the bolts in the outward position. The second dimension is smaller and is positioned for allowing the bolts to be in the inward, retracted position. This type of coupler require a large piece that must be moveable within the coupler. In some references, complex drive gears and gear racks are employed to move the engagement surface. In embodiments such as the use of a blocker or a drive gear and slidable engagement surface, the mechanism is not coupled to a lock cylinder and does not allow for optimum mechanical advantage. As such, there exists a need for an improved coupler that not only allows integration of the mount, hitch pin and lock, but also operates in a manner such as to provide optimal mechanical advantage in movement of the pieces and is cost efficient to produce.

SUMMARY OF INVENTION

The present invention relates to an integral locking coupler. The integral locking coupler includes a locking mechanism that is coupled to a set of engagement pins. The movement of the locking mechanism translates to the movement of the engagement pins to and from an extended position and a retracted position. When in the retracted position, the coupler can be inserted or removed from a receiver. When in the extended position, the engagement pins penetrate through holes in the receiver and secure the coupler to the receiver. The locking mechanism ensures that the engagement pins are maintained in the extended position and can not be manipulated to remove the coupler without unlocking the locking mechanism.

BRIEF DESCRIPTION OF DRAWINGS

The present invention will be more fully understood by reference to the following detailed description of the invention and the accompanying drawings. The drawings represent exemplary embodiments of the present invention and are included for illustrative purposes in order to facilitate understanding of the description. Other embodiments of the present invention contemplated by the description are included within this application to the extent they fall within the scope of the claims attached hereto.

DETAILED DESCRIPTION

The present invention is a integral locking ball mount, or coupler, 10 that performs the functions of a standard ball mount, hitch pin and lock. The coupler 10 include a lock cylinder 15 that is coupled to an actuation mechanism that uses optimal mechanical advantage to move a set of engagement pins 20 to and from an extended engagement position and a retracted disengagement position. This allows for the coupler 10 to easily installed and removed from a trailer receiver with minimal effort, while still maintaining maximum lock security of the coupler.

The coupler 10 includes a coupler housing 12 with an internal housing cavity 14 and two apertures 16 which align with the engagement pins 20. When the engagement pins 20 are in the extended position, the engagements pins 20 extend outward through the apertures 16 and beyond the coupler housing 12. When the engagement pins 20 are in the retracted position, the engagement pins 20 are drawn inward through apertures 16 and are either flush with the coupler housing 12 or are moved entirely or substantially within the housing cavity 14.

The integral locking ball mount 10 generally includes a ball mount plate 40, lock housing 44, lock cylinder, or other lock mechanism, 15 and locking pin subassembly 45. The locking pin subassembly 45, shown in FIG. 4, generally includes two engagement pins 20, two sliding pins 48, a biasing means, such as a spring, 50 and a housing 52. The housing 52 as shown include a main portion 53 and two side plates 54. The side plates 54 include apertures 55 through which the engagement pins 20 extend. The biasing means 50 applies force on the engagement pins 20 forcing them outwards into the engagement position.

Figure 1:
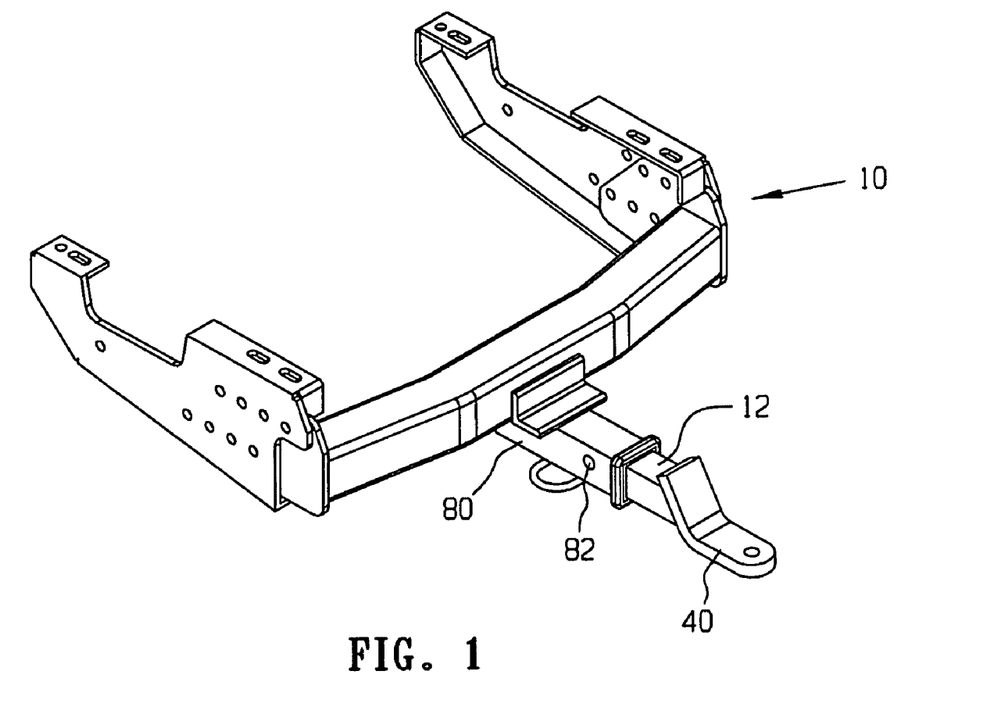
FIG. 1 is a perspective view of a integral locking ball mount of the present invention as applied to a towing hitch bar.
Figure 2:
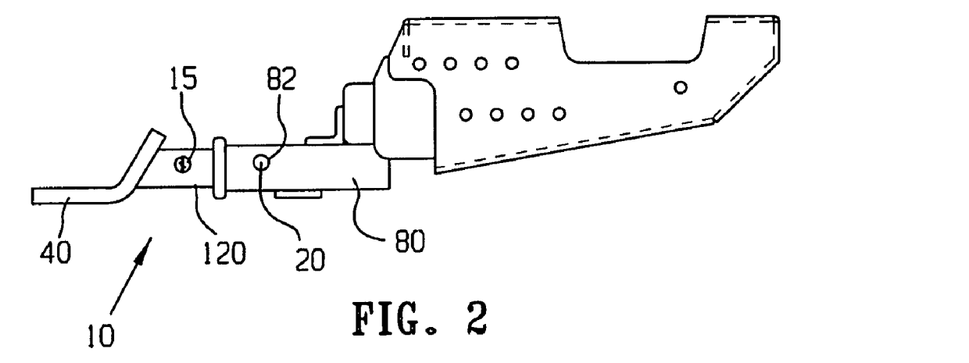
FIG. 2 is a slide plan view of the integral locking ball mount shown in FIG. 1.
Figure 3:
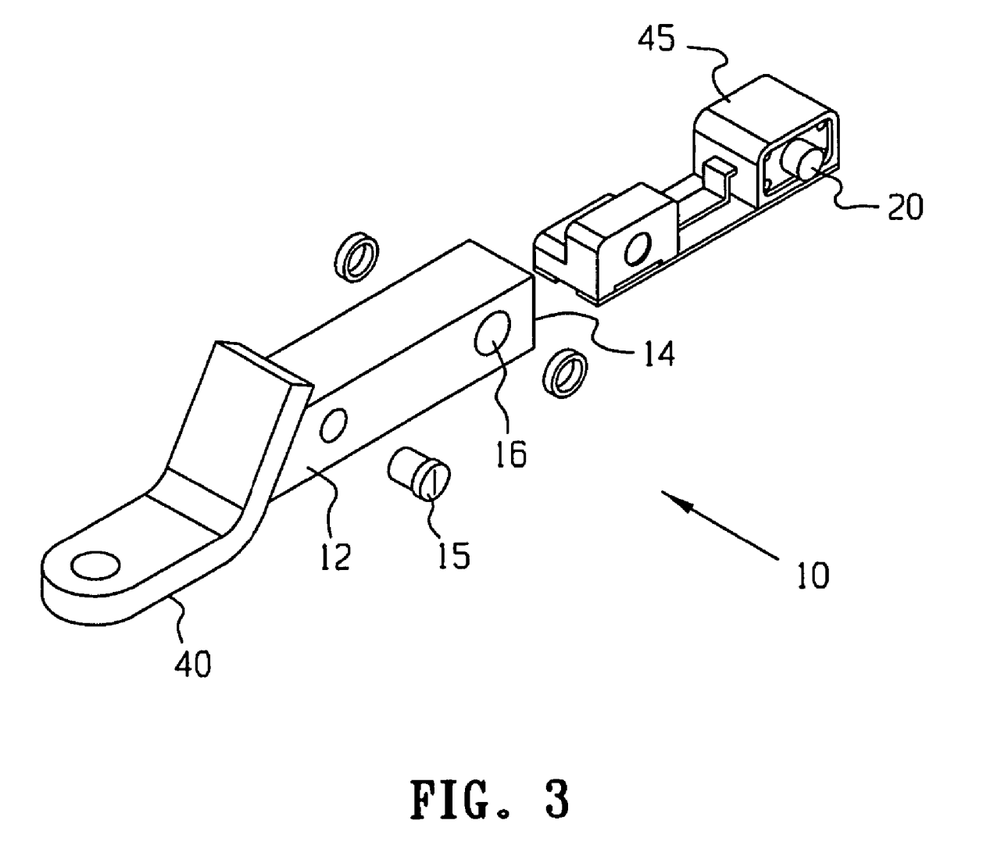
FIG. 3 is an exploded view of the integral locking ball mount shown in FIG. 1.
Figure 4:
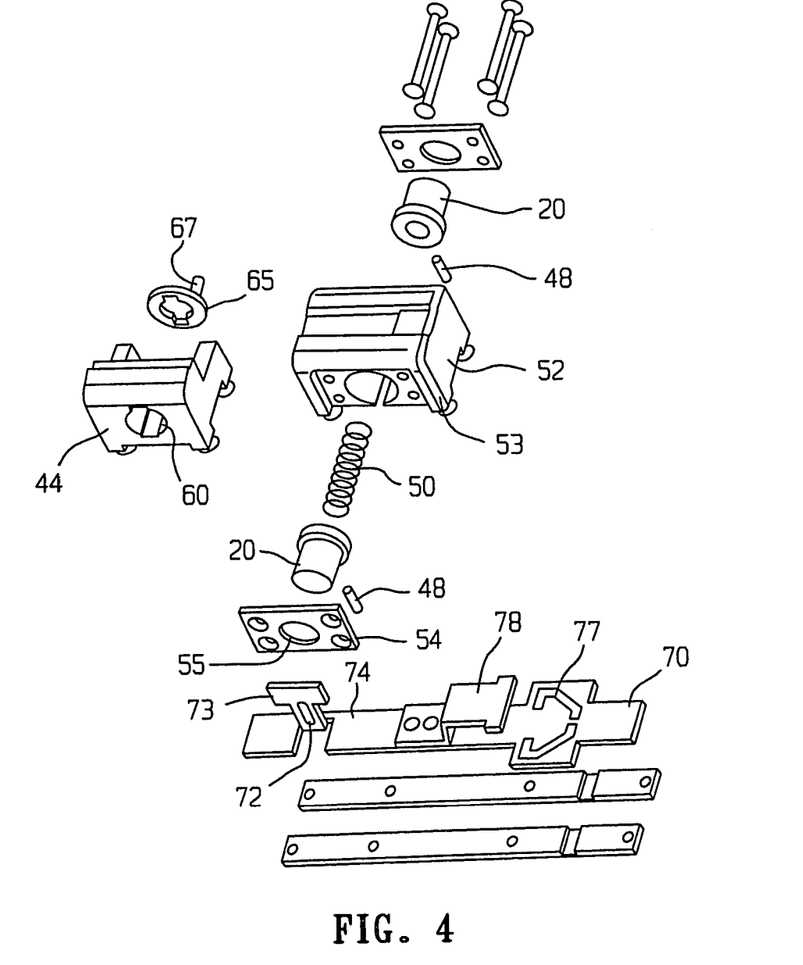
FIG. 4 is an exploded view of the internal components of the integral locking ball mount shown in FIG. 1.
Figure 5:
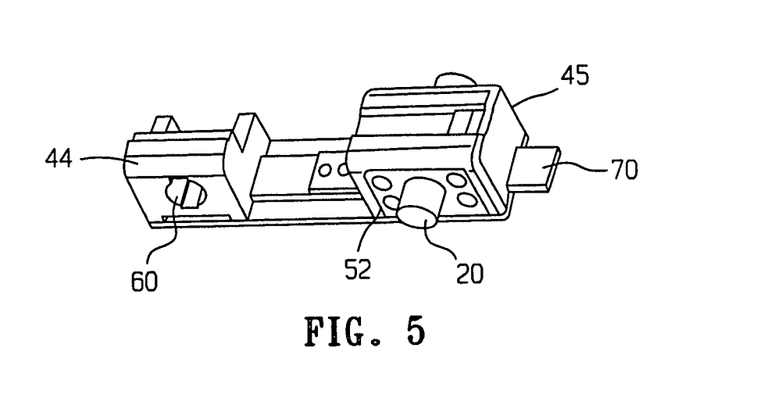
FIG. 5 is a perspective assembly drawing of the internal components shown in FIG. 4.

The cylinder 15 can be any conventional lock cylinder and is generally disposed within lock cylinder housing 60. The cylinder 15 engages cam 65 which engages lever 70. The cam 65 includes a protrusion 67 that engages slot 72 of the lever 70. In general, any mechanical coupling of the cylinder 15 to the lever 70 can be used provided that the rotation of the cylinder moves the lever in the horizontal plane, as shown in FIG. 4. As shown in FIG. 4, the slot 72 is located on a tab 73 that extends outward away from the main portion 74 of the lever. As the cylinder 15 is rotated to the unlocked position, generally a 180 degree rotation, the protrusion 67 rotates pulling the tab 73 and the lever 70 away from the engagement pins 20. This allows the engagement pins 20 to be retracted and the coupler 10 to be inserted or removed from the receiver, as explain in further detail below.

Lever 70 further includes pin slots 77 which engage sliding pins 48. Pin slots 77 are generally c-shaped, wherein the bottom of the c-shape 77b is angled inward toward the center of the lever 70. As such, when the sliding pins 48 are moved along the pin slots 77 the sliding pins 48 not only travel axially, but also travel radially inward toward the center of the of coupler 10. Since the sliding pins 48 are coupled to the engagement pins 20, the axial movement of the sliding pins 48 cause the engagement pins 20 to extend and retract. This movement of the engagement pins 20 allows the coupler 10 to be inserted and removed from a receiver. Optionally, the lever 70 may include a blocker 78 which extends from the lever 70 to be in between the engagement pins 20 when in the extended position. The blocker 78 provides additional security against attempts to manually retract the engagement pins 20. The blocker 78 can be any shape or configuration provided it provides additional security to prevent the movement of the engagement pins to the retracted position when the coupler is in the locked position.

To install the coupler 10 shown in FIGS. 1–5, a key (not shown) is inserted into the lock cylinder 15 and rotated 180 degrees to unlock the cylinder. The rotation of the cylinder 15 slides the lever 70 axially through engagement with cam 65. The axial movement of the lever 70 moves the sliding pins 48 along pin slots 77 and moves the blocker 78 away from the engagement pins 20. The engagement pins 20 are thus retracted into the coupler housing cavity 14 and thus do not extend beyond the coupler housing 12. So positioned, the coupler 10 can be inserted into a receiver 80 in conventional fashion. The engagement pins 20 are aligned with apertures 82 in the receiver and then the cylinder 15 is rotated back to the locked position. In doing so, the lever 70 slides back to the engagement position, wherein the slide pins 48 move to the radially outward portion of the pin slots 77. The movement of the sliding pins 48 move the engagement pins 20 to the extended position, thereby penetrating through the coupler housing 12 and through the holes 82 in the receiver 80. If a blocker 78 is used, the blocker will be positioned between the engagement pins 20 when in the extended position to further prevent inward movement of the engagement pins. The spring 50 biases the engagement pins 20 outward towards the extended position. It should be appreciated that the spring or biasing means 50 is not required to move the engagement pins 20 to or from the engagement position, but the inclusion of such biasing means provides additional security in maintaining the engagement pins in the extended position.

To remove the coupler shown in FIGS. 1–5, the key is inserted into the lock cylinder 15 and rotated 180 degrees to the unlocked position. The rotation of the lock cylinder 15 moves the lever 70 and draws the engagement pins inward into the coupler cavity 14 and out of engagement with the receiver apertures 82. The coupler 10 can then be removed from the receiver 80.

Figure 6:
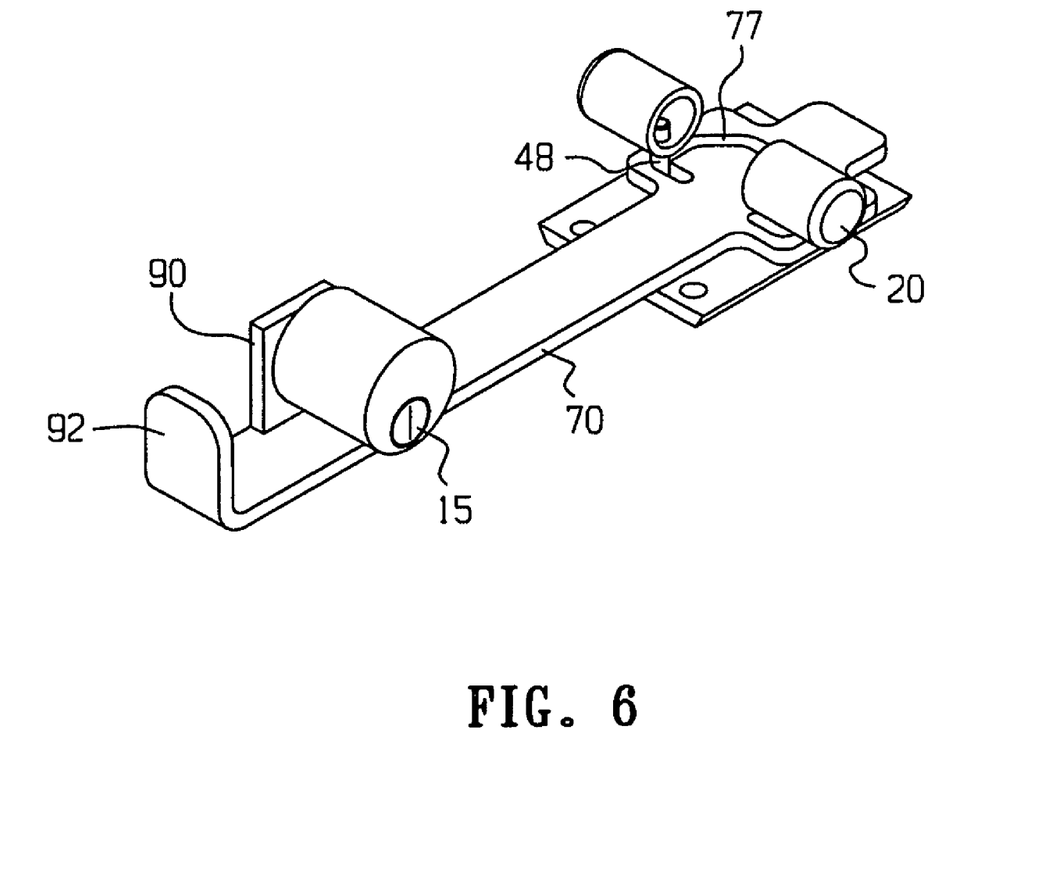
FIG. 6 illustrates an alternative embodiment of the integral locking ball mount of the present invention.

FIG. 6 illustrates a different lever mechanism. The cylinder 15 in FIG. 6 engages blocker 90 and moves it up and down, as shown in FIG. 6, to engage and disengage the lever 70. Once disengaged, the lever 70 can be pulled axially outward by manipulation of lever portion 92. The movement of the lever 70 then moves the engagement pins inward or outward as described above.

Figure 7:
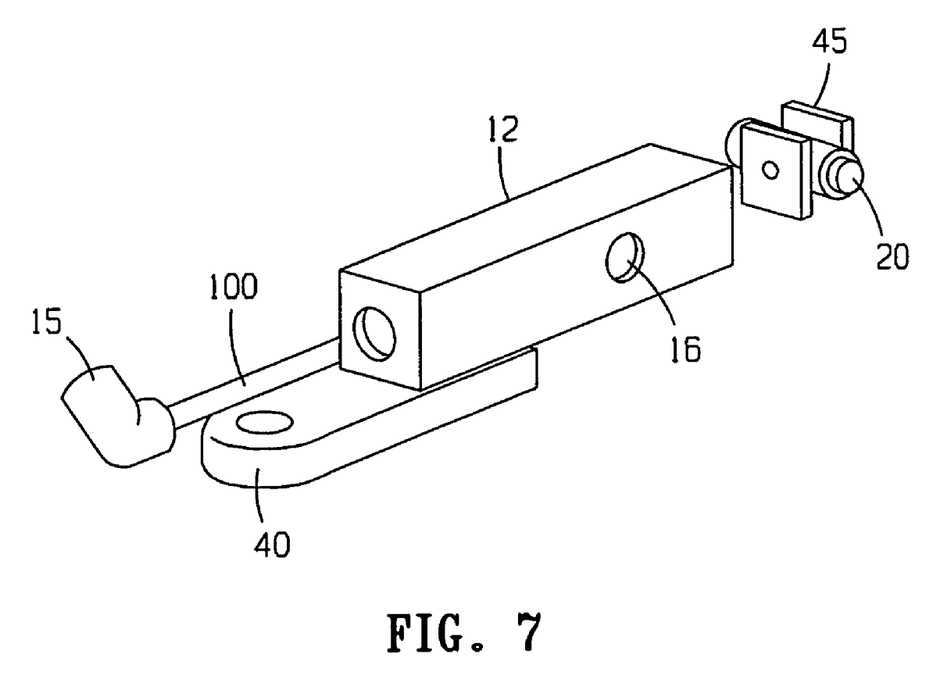
FIG. 7 illustrates an alternative embodiment of the integral locking ball mount of the present invention incorporating a rotating cam and shaft.
Figure 8:
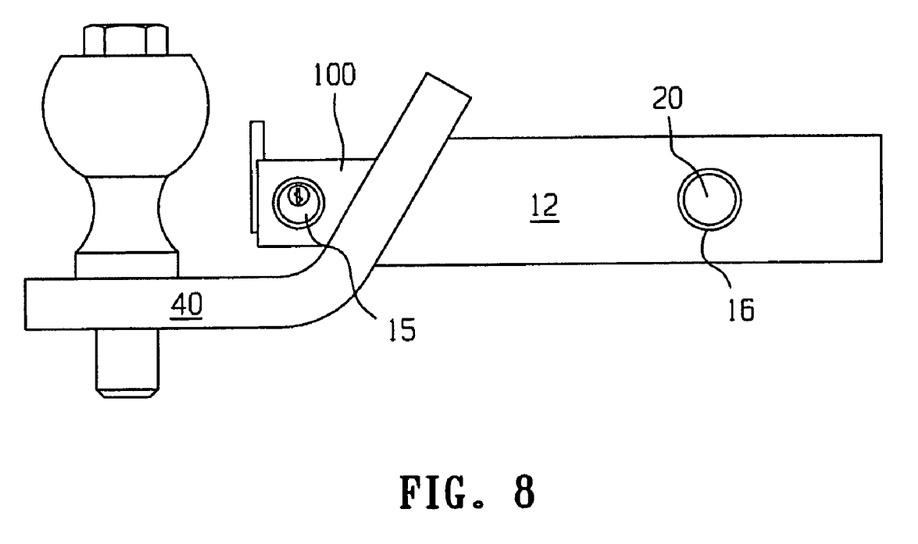
FIG. 8 illustrates an another alternative embodiment of the integral locking ball mount of the present invention incorporating a rotating cam and shaft.
Figure 9:
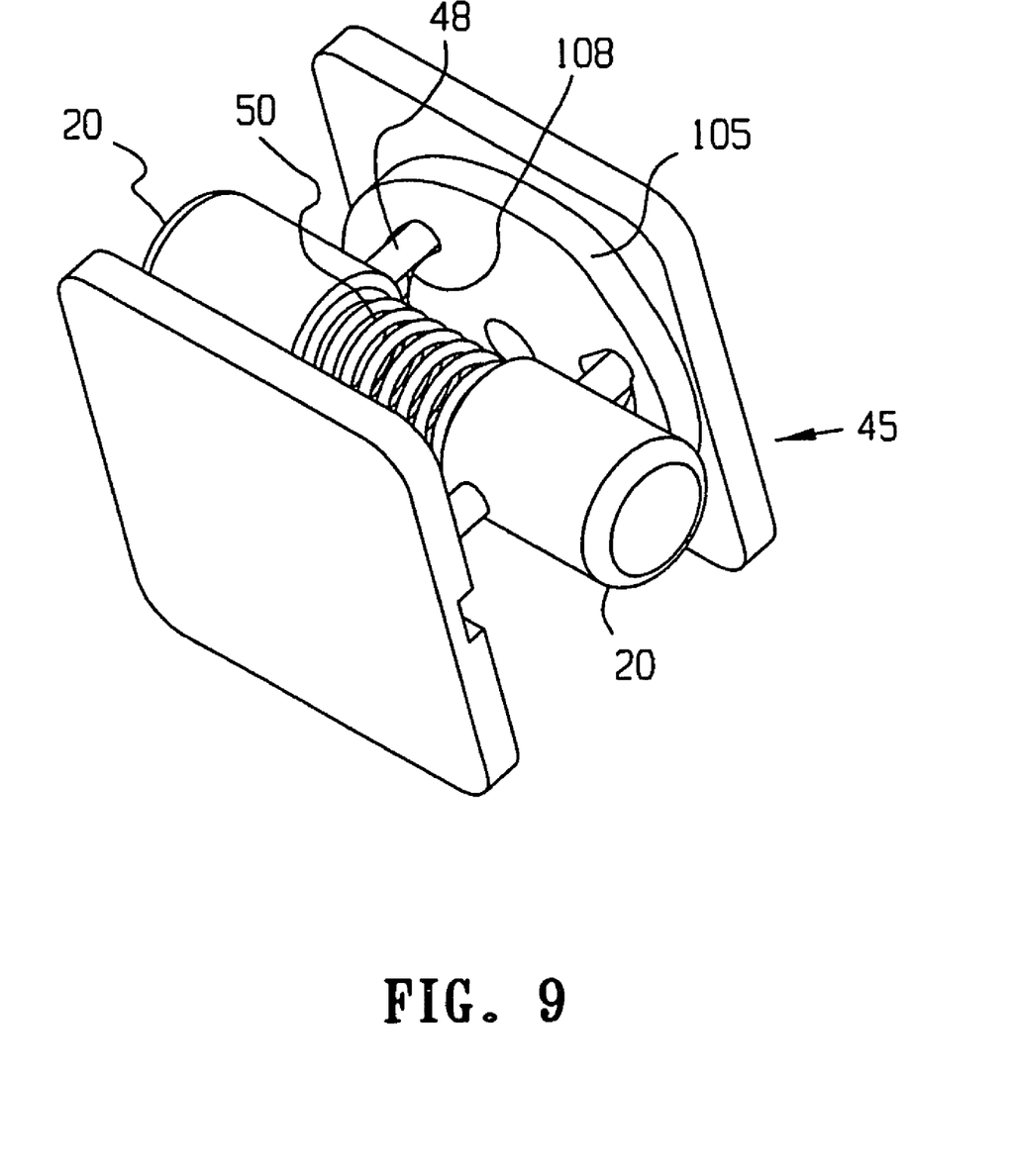
FIG. 9 illustrates the locking pin subassembly of the rotating cam and shaft embodiments.
Figure 10:
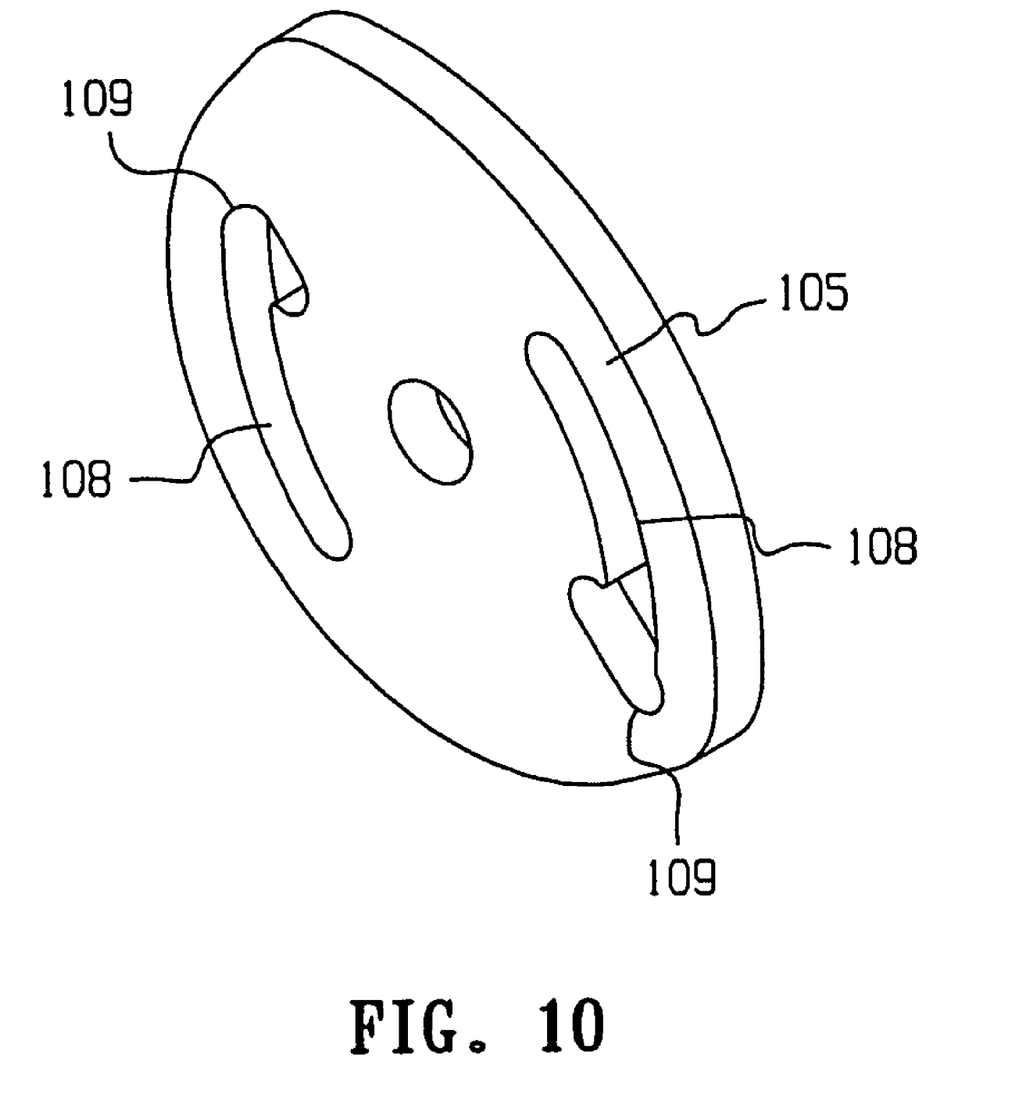
FIG. 10 illustrates the rotating cam of FIG. 9.

FIGS. 7 and 8 illustrate another embodiment of the integral ball mount of the present invention. FIGS. 7 and 8 differ merely in the location of the lock cylinder 15. The lever of the prior embodiment is replaced with a shaft 100 coupling the lock cylinder 15 to the engagement pins 20. Rotation of the lock cylinder 15 allows for rotation of the shaft 100, which in turn rotates cam 105, as best shown in FIG. 10. The cam 105 includes two sliding pins recesses 108 which start towards the outer periphery 109 of the cam 105 and gradually tapers inward toward the center of the cam 105. The sliding pins 48 are coupled to the engagement pins 20 such that when cam 105 is rotated, the sliding pins 48 move circumferentially and radially inward toward the center the cam 105, thereby drawing the engagement pins 20 into the coupler cavity 12. So positioned, the coupler can be inserted or removed from a receiver. Rotation of the shaft 100 in the other direction, will rotate the cam 105 back and move the engagement pins 20 to the extended position. Although not shown in the illustrative examples, one skilled in the art should appreciate that the cylinder and shaft can be mechanically coupled such that rotation of the cylinder would not only unlock the cylinder, but also translate the rotation to the shaft.

Figure 11:
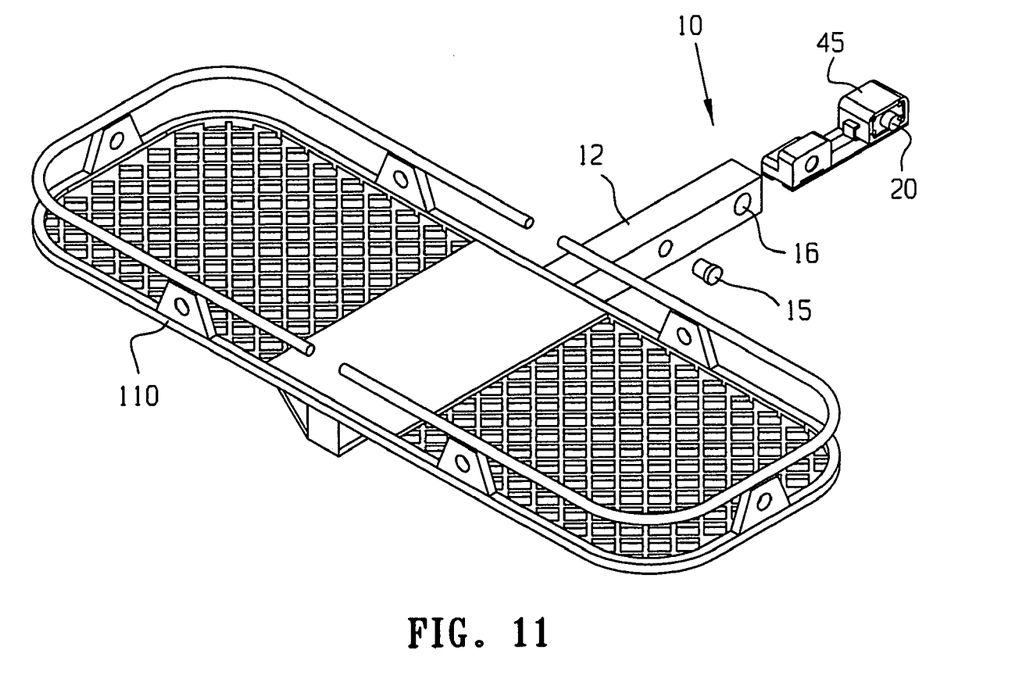
FIG. 11 illustrates an alternative embodiment of the invention, wherein the integral coupling is employed in combination with a cargo carrier.

FIG. 11 illustrates an alternative embodiment of the invention. FIG. 11 illustrates the coupling mechanism applied to a cargo carrier 110. One skilled in the art should appreciate that the coupling mechanism described herein can be applied not only to a ball mount, but also to cargo carriers, bike carriers, and the like. Such embodiments are meant to be included within the scope of this application.

It should be appreciated that the locking mechanism 15 can be a variety of mechanisms that provide the end user with a means for locking the integral locking ball mount. For example, the locking mechanism can be an interchangeable wafer lock cylinder, non-interchangeable wafer lock cylinder, pin tumbler cylinder, a push-button lock cylinder, or a tubular lock cylinder. In one embodiment the locking mechanism 15 is located along a side wall portion 120 of the coupler housing 12. In another embodiments, the locking mechanism 15 is located at the end of the coupler housing 12 or apart of the shaft of lever coupling the lock mechanism to the engagement pins.

The detailed description has been provided for clearness of understanding of the present invention and is not intended to unnecessarily limit the scope of the invention. Modifications will be obvious to those of ordinary skill in the art, and such modifications are intended to be included as part of this invention to the extent they fall within the scope of the claims attached hereto

What is claimed is:

1. A ball mount for locking to a receiver, said ball mount comprising:
   a housing; and
   a locking cylinder disposed with said housing and mechanically coupled to a plurality of engagement pins;
   wherein rotation of said lock cylinder moves said engagement pins between two positions, a first position wherein said plurality of engagement pins extend beyond said coupler housing and an second position wherein said plurality of engagement pins do not extend beyond said coupler housing.

2. The ball mount of claim 1 wherein said engagement pins are locked in said first position.

3. The ball mount of claim 1 wherein said engagement pins are unlocked in said first position.

4. The ball mount of claim 1 further comprising a lever that couples said lock cylinder to said plurality of engagement pins.

5. The ball mount of claim 4, wherein said lever comprises a slot for receiving a protrusion on a cam coupled to said lock cylinder.

6. The ball mount of claim 4, wherein said lever comprises a plurality of slots each receiving a pin coupled to one of said plurality of engagement pins.

7. The ball mount of claim 6, wherein each of said plurality of slots has two end portions, a first end portion located toward an edge of said lever and a second end portion located toward a center portion of said lever.

8. The ball mount of claim 1 further comprising a blocker positioned between said plurality of engagement pins.

9. The ball mount of claim 1 further comprising a biasing means located between said plurality of engagement pins.

10. The ball mount of claim 1 further comprising a rotatable shaft that couples said lock cylinder to said plurality of engagement pins.

11. The ball mount of claim 1 further comprising a generally circular cam that includes a plurality of slots, each receiving a pin coupled to one of said plurality of engagement pins.

12. The ball mount of claim 1, wherein said lock cylinder is located on a side surface of said coupler housing.

13. A ball mount for locking to a receiver, said ball mount comprising:
   a lock cylinder disposed within a ball mount housing and coupled to a cam, said cam including a protrusion;
   a lever including a first slot for receiving said protrusion and a second and third slot located on an opposite end of the lever as the first slot;
   a pair of pins secured within said second and third slots; and
   a pair of engagement pins, wherein said pair of pins are secured to said pair of engagement pins;
   wherein rotation of said lock cylinder moves said pair of engagement pins between two positions, a first position wherein said plurality of engagement pins extend beyond said ball mount housing and a second position wherein said plurality of engagement pins do not extend beyond said ball mount housing.

14. The ball mount of claim 13 further comprising a blocker positioned between said pair of engagement pins.

15. The ball mount of claim 13 further comprising a biasing means located between said pair of engagement pins.

16. A ball mount for locking to a receiver, said ball mount comprising:
   an elongated tubular housing; and
   a key operated locking cylinder disposed with said housing and mechanically coupled to a plurality of engagement pins;
   wherein insertion of a proper key and rotation of said lock cylinder moves said engagement pins between a locked position wherein said plurality of engagement pins extend beyond said ball mount housing and an unlocked position wherein said plurality of engagement pins do not extend beyond said ball mount housing.

17. A vehicle hitch assembly comprising:
   a) a receiver including a pair of apertures; and
   b) a ball mount including a pair of engagement pins that are selectively received in said pair of apertures, wherein said ball mount comprises:
      i) a lock cylinder disposed within a housing and coupled to a cam, said cam including a protrusion;
      ii) a lever including a first slot for receiving said protrusion and a second and third slot located on an opposite end of the lever as the first slot; and
      iii) a pair of pins secured within said second and third slots, wherein said pair of pins are secured to said pair of engagement pins;
   wherein rotation of said lock cylinder moves said pair of engagement pins between two positions, a first position wherein said plurality of engagement pins extend beyond said ball mount housing and a second position wherein said plurality of engagement pins do not extend beyond said ball mount housing.

18. The vehicle hitch assembly of claim 17 further comprising a blocker positioned between said pair of engagement pins.

19. The vehicle hitch assembly of claim 17 further comprising a biasing means located between said pair of engagement pins.

20. The vehicle hitch assembly of claim 17 further comprising a ball mount plate defining a hitch ball aperture.

21. The vehicle hitch assembly of claim 17 further comprising a hitch bar coupled to said ball mount.

* * * * *